Patented Sept. 21, 1948

2,449,876

UNITED STATES PATENT OFFICE 2,449,876

PLASTIC COMPOSITIONS AND PROCESS OF MAKING THE SAME

Francis E. Calvert and Paul A. Bury, Cincinnati, Ohio, assignors to The Drackett Company, Cincinnati, Ohio, a corporation of Ohio No Drawing. Application March 19, 1947, Serial No. 735,800

10 Claims. (Cl. 260—7)

This invention relates to improvements in thermosetting plastic compounds, suitable for molding purposes, and capable of conversion to insoluble and infusible form by the heat and pressure applied during the molding operation, and to methods of forming and processing such compounds. More specifically, the invention relates to the preparation of a modified phenolic resin having unique characteristics and properties and to molding compositions containing or employing such resins.

In the compression molding of thermosetting plastic compounds, the molder's problems are greatly increased as the fillers are changed from products like wood flour, clay, mica, oxides, etc., to fibrous fillers such as cotton flock, macerated cloth, chopped canvas, and tire cord. For moldings having high shock resistance, such long fibered fillers are a requisite, but are disadvantageous to the molder because of their high bulk when impregnated with resin. Molds which, because of size and shape, have limited filling space, are difficult to load with a high bulk compound; often loading is not possible. These bulky, high impact compounds have been in use for many years, and the molder has been faced with the problem of devising his own means of consolidating the compound into a form sufficiently dense to allow for proper loading of the mold. The term "preforming" has been applied to any such method for compressing and consolidating a bulky material prior to molding. Automatic preforming in a tabletting machine is not feasible with such material as it will not feed uniformly by gravity into the relatively small cavities of tabletting machines. Consequently, the molder customarily makes his own preforms by the slow and costly method of cold pressing each charge in a single cavity mold using a hydraulic press which requires the same amount of pressure that is used in molding the final product. It can readily be understood that this process is very uneconomical and that it ties up a press which otherwise could be used for a hot molding operation. The cost of preforming has been estimated by molders to be roughly two-thirds of the cost of molding the final product.

It is an object of the present invention to overcome these and other difficulties encountered in the molding of bulky, high impact compounds, and to relieve the molder of the necessity of doing his own preforming.

A further object of the invention is to provide a plastic compound, said compound being especially suited for making preforms as described above.

The term "flow" is used in the molding trade to designate the rate at which a plastic compound moves, and the distance through which it moves, when subjected to heat and pressure in a mold. By the practice of the present invention, thermosetting plastics exhibiting unusually high flow may be produced; the resin of the present invention, when employed with fibrous fillers in the manufacture of molded structures, shows little or no tendency to segregate on flowing into the mold, and the molded products exhibit a finish which cannot be achieved by the use of more conventional resins. As the result of the improved properties of our molding compounds, and particularly their high density and enhanced flow, substantial savings in time and cost in the preforming and the molding of plastics may be achieved.

In accordance with the instant invention, these and other objects and advantages are attained by preparing a phenolic type resin differing in molecular structure from resins heretofore prepared, and possessing the unique and desirable properties hereinbefore mentioned. Thus in the preferred practice of our invention, the resin is prepared in two steps, the first step involving reaction of phenol, aniline, and formaldehyde in the presence of lime as the sole catalyst, whereby a primary resin is formed, and the second step comprising the reaction of this primary resin with vegetable protein, for instance soybean protein or meal. In the second step of the process, the protein takes part in the condensation reaction and enters into the molecular structure of the resin. By reason of the superior properties of a resin so formed, it is possible to prepare high impact preforms, employing long fibered fillers, in a novel manner. For instance, resin prepared as described may be kneaded while hot with a macerated fibrous filler so as to form a tough, doughy mass. This mass may be pressed between rolls to form a sheet which may readily be cut into preforms of desired shape. Preforms so prepared possess unusually high density and are easily inserted into compression molds; they flow within the mold more rapidly and with less pressure than preforms of high impact material prepared by the more expensive and time-consuming methods heretofore practiced.

In the following examples, typical methods of practicing the invention are set forth. It will be appreciated, however, that by the use of specific language in these examples, no limitation of the scope of the invention is intended. On the contrary, such modifications and alterations of the practice are contemplated as would occur to one skilled in the art, having due regard to the limits of the processing conditions hereinafter generally set forth.

Example I

A primary resin mix is made of the following liquids:

| | Pounds |
|---|---|
| Phenol | 55.5 |
| Formaldehyde (solution 37.5% HCHO by weight) | 67.0 |
| Aniline | 6.875 |

These are subjected to rapid mixing in the resin kettle and, when thoroughly mixed, 3.1875 lbs. chemical hydrated lime $Ca(OH)_2$ are added as the sole catalyst. An exothermic reaction takes place which is preferably so controlled that the increase in temperature of the reaction mixture is generally proportional to the elapsed time, although the temperature rise during the latter part of the reaction may be somewhat more rapid than during the earlier part. The boiling point is usually reached in from 15 to 20 minutes, and this temperature may then be maintained for an additional period of from 3 to 20 minutes. It is preferred to so control the reaction that the batch is brought to the boiling point in 17 or 18 minutes and held for 4 or 5 minutes thereafter. The primary resin is then pumped into a heavy duty dough mixer containing the following dry mixed ingredients:

| | Pounds |
|---|---|
| Soybean meal | 29.0 |
| Black dye | 3.5 |
| Stearic acid | 2.0 |

The mixture of primary resin and dry ingredients is reacted with slow agitation for a period of 45 to 90 minutes in a closed vessel under the vapor pressures of the mixture, at a temperature of 140° to 170° F. It is preferred to react the mixture for a period of 45 minutes under the vapor pressure of the mixture at a temperature of from 150° to 160° F. At the end of this period, the reaction chamber is put under a vacuum of 27 to 29 inches of mercury and water is removed by vacuum distillation, usually within 60 to 90 minutes. Excess formaldehyde, methanol which is present in commercial formaldehyde, and traces of unreacted phenols are also removed. Temperature during this period increases progressively from 105° to 170° F. as the moisture is removed. The resin, now in a stiff paste or dough form and with a moisture content of from 3 to 9%, is discharged from the reaction chamber and is preferably sheeted at once to promote rapid cooling. The sheets may be stored until required for use, for instance as set forth in Example II.

The protein portion of the soybean component has been shown by experiment to go into solution in the primary resin, enters into the condensation reaction, and becomes a part of the resinoid molecule. It is not to be confused with soybean meal added to a finished or partially finished resin as a filler. In this invention protein is not added merely as a filler, nor will a proteinaceous material which has been previously reacted with lime or formaldehyde, and thus partially or completely insolubilized, produce equivalent results. Meal derived from other vegetable sources of protein, for instance, peanut or cottonseed, may be employed in lieu of the soybean meal, and isolated protein derived from these sources may also be substituted for the meal. Coloring agents such as pigments, lakes and toners, may be used in place of black dye, and other lubricants such as zinc or aluminum stearate may be used in place of stearic acid.

Homologs of phenol such as meta-para cresol or resin cresol, which are usable in equivalent amounts to phenol, may be used in place of phenol; the equivalent resins so obtained are embraced by the term "phenol-formaldehyde resin" as used herein.

Example II

Sheeted resin prepared as described in Example I is broken into coarse particles and fed into a heavy-duty mixing and kneading machine of the Banbury type. Macerated fillers such as cotton flock, chopped woven fabrics, asbestos fiber or chopped cord are charged into the machine and the mass is milled under an intensive kneading action, the temperature of the mass being maintained at 150° to 250° F. Milling requires from 1 to 4 minutes. The fillers are coated and impregnated with resin by this treatment. The filled resin is discharged from the machine and passed immediately through sheeting rolls to form a sheet of any desired thickness. The sheet may be die-cut while warm into preforms having any desired contour. The thickness will be that of the sheet and may be varied by changing the setting on the sheeting rolls.

Another means of cutting preforms from the sheeted stock is to allow the sheet to cool, then pass a stack of such sheets through a high speed power band saw using the principle of friction sawing. Square or rectangular preforms of various thickness having small areas can be cut rapidly and very accurately by this method.

Another method of making preforms is to take the hot mass from the Banbury mixer and pass it immediately through a set of briquetting rolls. The machine consists of two rolls revolving slowly in opposite directions, the faces of the rolls being fitted with cavities of any desired shape. For mass production of a few simple shapes this is the most economical method, but other methods of shaping the filled product while hot may be employed. Various modifications of the cutting, sawing, and shaping methods described may be used without departing from the scope of the invention.

The following examples illustrate further the method of making a resin similar to that obtained by proceeding in accordance with Example I, and capable of manufacture into preforms in accordance with Example II. It will be understood that in each of the following examples the reaction of the primary resin and protein is followed by the dewatering step.

Example III

One thousand one hundred and twenty-five (1,125) grams of phenol and 67.5 grams of aniline were mixed together. To this 1,200 grams of formaldehyde were added. The mixture was cooled to 98° F., and 75.0 grams of $Ca(OH)_2$ were added. An exothermic reaction started which was controlled in accordance with the following time-temperature curve:

| Time, minutes | 5 | 7 | 10 | 12 | 15 | 17 | 20 | 25 |
|---|---|---|---|---|---|---|---|---|
| Temperature, °F | 116 | 138 | 160 | 171 | 190 | 201 | 202 | 148 |

The primary resin was transferred to a Baker-Perkins mixer. Five hundred and sixty-five (565) grams of oil-free soybean meal containing about 20% protein (dry basis) and 70.0 grams of dye were added and the ingredients reacted together for one hour at an average temperature of about 150° F., after which the resin was dewatered as described in Example I.

*Example IV*

One hundred and thirty-five (135) grams of aniline and 1,025 grams of phenol were mixed together, then 1,295 grams of formaldehyde were added. This solution was cooled to 105° F. and then 75.0 grams of Ca(OH)$_2$ were added. An exothermic reaction ensued which followed the time-temperature curve of:

| Time, minutes | 5 | 7 | 10 | 12 | 15 | 17 | 20 | 25 |
|---|---|---|---|---|---|---|---|---|
| Temperature, °F | 125 | 137 | 162 | 166 | 192 | 202 | 201 | 154 |

The resin was transferred to a Baker-Perkins mixer, 565 grams of soybean meal such as used in Example III and 70.0 grams of dye were added and the mixture reacted one hour at approximately 150° F.

*Example V*

Thirty (30) pounds of phenol and 34 pounds 8 ounces of formaldehyde were mixed together. To this 3 pounds of Ca(OH)$_2$ were added. The following time-temperature curve shows the course of the reaction:

| Time, Minutes | 1 | 3 | 5 | 7 | 9 | 10 | 11 | 13 | 15 |
|---|---|---|---|---|---|---|---|---|---|
| Temperature, °F | 90 | 100 | 114 | 136 | 158 | 162 | 171 | 173 | 173 |

| Time, Minutes | 17 | 19 | 21 | 23 | 25 | 27 | 30 | 35 |
|---|---|---|---|---|---|---|---|---|
| Temperature, °F | 199 | 191 | 196 | 199 | 196 | 194 | 195 | 149 |

The resin was transferred to a Baker-Perkins mixer and 15 pounds of soybean meal (20% protein) and 1 pound 14 ounces of nigrosine were added. The mixture was reacted 80 minutes at 150° F.

*Example VI*

One hundred and thirty-five (135) grams of aniline and 1,080 grams of phenol were mixed together, then 1,295 grams of formaldehyde were added and the solution cooled to 101° F. Then 56 grams of lime were added. The time-temperature curve was as follows:

| Time, Minutes | 5 | 7 | 10 | 12 | 15 | 17 | 20 | 25 |
|---|---|---|---|---|---|---|---|---|
| Temperature, °F | 114 | 128 | 160 | 169 | 190 | 200 | 203 | 152 |

This resin was mixed with 565 grams of the soybean meal of the preceding examples and 70 grams of dye, and reacted for one hour at about 150° F.

*Example VII*

One thousand two hundred and ninety-five (1,295) grams of formaldehyde were added to 1,125 grams of phenol. This mixture was cooled to 75° F., then 112.0 grams of lime were added with rapid stirring. The following exothermic time-temperature curve was obtained:

| Time, Minutes | 5 | 10 | 15 | 17 | 20 | 25 |
|---|---|---|---|---|---|---|
| Temperature, °F | 100 | 138 | 199 | 201 | 192 | 132 |

The resin was then transferred to a Baker-Perkins mixer, 565 grams of the soybean meal of the preceding examples and 20 grams of dye were added. This mass was reacted one hour at about 150° F.

*Example VIII*

One thousand and eighty (1,080) grams phenol and 135 grams of aniline were mixed together, then 1,250 grams of formaldehyde were added. The mixture was cooled to 84° F. and 50 grams of lime were added. The following exothermic reaction took place:

| Time, Minutes | 1 | 5 | 7 | 10 | 12 | 15 | 17 | 20 | 25 |
|---|---|---|---|---|---|---|---|---|---|
| Temperature, °F | 92 | 102 | 116 | 151 | 162 | 180 | 200 | 204 | 151 |

This resin and 270 grams of soybean protein (90% pure) were introduced into a Baker-Perkins mixer and reacted one hour at about 150° F.

*Example IX*

One thousand and eighty (1,080) grams of phenol and 135 grams of aniline were mixed together. To this were added 1,250 grams of formaldehyde. The mixture was cooled at 86° F. and 50 grams of lime were added. The following exothermic reaction occurred:

| Time, Minutes | 1 | 5 | 7 | 10 | 12 | 15 | 17 | 20 | 25 |
|---|---|---|---|---|---|---|---|---|---|
| Temperature, °F | 90 | 108 | 124 | 142 | 162 | 186 | 200 | 203 | 151 |

The resin was transferred to a Baker-Perkins mixer and 1,080 grams of isolated soy protein (containing 90% protein on a bone-dry basis) were added. This mixture was reacted one hour at 150° F.

*Example X*

One thousand and eighty (1,080) grams of phenol and 135 grams of aniline were mixed together. Then 1,250 grams of formaldehyde were added. This mixture was cooled to 98° F. and 50 grams of lime were added. The reaction gave the following time-temperature curve:

| Time, Minutes | 2 | 5 | 7 | 10 | 12 | 15 | 17 | 20 | 25 |
|---|---|---|---|---|---|---|---|---|---|
| Temperature, °F | 106 | 116 | 124 | 142 | 163 | 188 | 203 | 204 | 150 |

The resin was transferred to a Baker-Perkins mixer and 1,080 grams of oil-free soybean meal containing about 46% protein by weight were added. This mixture was reacted for one hour at 150° F.

In any of the foregoing examples, other vegetable protein substances, in amount affording comparable protein content may be used in lieu of soybean meal or protein. Peanut and cottonseed are excellent sources.

The ingredients actually employed in the foregoing examples are of the following grades, although the use of such grades is not material to the successful practice of the invention.

Phenol—U. S. P.
Aniline—U. S. P.
Formaldehyde—U. S. P. solution averaging 37.5% formaldehyde by weight.
Lime—chemically hydrated Ca(OH)$_2$.
Stearic acid—triple pressed.
Nigrosine—commercial black dye.

In the practice of the instant invention, the several ingredients of the resin may be used in varying proportions. Best results are achieved, however, by observing the following ranges of proportions, given in each instance in percentage by weight of the amount of phenol employed.

The lime to phenol ratio should not be substantially in excess of 6% by weight of phenol or substantially less than 4%. Formaldehyde may be employed in amount ranging from 37.5% to about 49% by weight of phenol. The formaldehyde is usually added as an aqueous solution; if a solution containing 37.5% HCHO by weight is employed, the amount of solution may vary from 100% to 130% by weight of phenol. The ratio of protein to phenol may vary from about 7% to about 43% by weight.

Certain advantages of the invention may be realized without the use of aniline. However, if aniline is employed in an amount not less than 3.0% of the weight of the phenol in the resin, a measurable increase in the flow characteristics will be obtained. The upper limit of the amount of aniline which can be used is 12.5% of the weight of the phenol in the resin. If more aniline than this is used, it will not react and become a part of the resin but will simply distill off during the dewatering period.

The use of lime as the sole catalyst is essential to the production of the resin of the present invention. Efforts to achieve the desired results with the use of catalysts other than lime, or with the use of lime in admixture with another catalyst, for instance ammonia, in quantity sufficient to exert significant catalytic effect, have proved unsuccessful. Indeed, the use of ammonia in addition to lime negates the advantages achieved when lime alone is used. It is also essential to effect the initial reaction of phenol, aniline, and formaldehyde, in the presence of the lime catalyst, before the protein is introduced. Satisfactory results are not achieved, for instance, by reacting protein with lime, and thereafter adding the modified protein to the resin.

In short, the present invention contemplates the employment of the succession of basic processing steps as described herein for the purpose of effecting chemical combination between the protein and the resin. If these basic principles are followed, the proportions of the several ingredients and the processing conditions may be varied to a considerable extent; highly satisfactory results are obtained within the limits hereinbefore indicated.

Differences between the resinoid claimed herein and the conventional phenol-formaldehyde resinoid, and certain advantages achieved by our invention may be summarized as follows:

1. Conventional phenol-formaldehyde molding type resin is reacted and dewatered in the liquid phase. It does not become a doughy mass; when cooled it becomes hard and very brittle. In preparing the resin claimed herein, less than a half hour is spent reacting phenol, aniline, and formaldehyde in the liquid phase. As soon as the proteinaceous material is added, the mixture becomes doughy and the remainder of a 3½-hour reaction period is spent reacting the doughy mass. A tough mastic having a consistency approaching that of soft rubber is formed. Thus the viscosity characteristics of this resin are entirely different from those of the conventional phenolic resin. The difference is due to the reaction of soybean protein with the primary phenol-aniline-formaldehyde reaction product.

2. A conventional phenol-formaldehyde resin has a sharp melting point, therefore it remains solid until its melting point is reached, above which it becomes a liquid and flows freely. The protein-modified resin claimed herein does not have a definite melting point. It softens slightly under very low temperature and will show a slow increase in flow characteristics as the temperature is raised, but it will not melt, and will not flow freely until it is enclosed and pressure applied. Thus the conventional phenolic resin is not well adapted to mixing with fillers in a Banbury type mixing machine, for if the mixing chamber is not hot enough to melt the resin, the fillers will not be impregnated and if the resin melts it flows too readily around the discharge openings and around the pneumatic hammer, thus clogging the working parts of the machine, rendering it inoperative. The viscous, cohesive nature of our protein modified resin makes it ideal for use in such a machine, allowing for a masticating and kneading operation which impregnates each particle of filler yet readily discharges from the machine. A plastic material which lends itself to the milling operation of a Banbury machine can conveniently be preformed. As hereinbefore explained, a resin with a sharp melting point is unsuitable for a Banbury milling operation. The customary methods used by the manufacturers of conventional phenolic resins for impregnating fillers are (1) to dissolve the resin in an organic solvent, dip the fillers in a bath of the liquid resin, drain off the excess, dry the mass and recover the solvent, or (2) dry mix finely ground resin and filler in a ball mill, depending upon the weight of the balls to drive a certain amount of the dry resin into the filler. In either case, a loose shredded mass is produced which cannot conveniently or economically be sheeted or otherwise compressed into a form suitable for the manufacture of preforms.

The unique characteristics and advantages of preforms prepared in accordance with the instant invention may be outlined as follows:

*Density.*—Preforms made under the claimed process are much more dense than those made by the custom molder. The latter compresses loose, bulky, cold compound into short cylindrical preforms, whereas we compress hot compound, which has not been disintegrated into a loose bulky condition, between sheeting rolls under tremendous pressure to form the sheets from which preforms are cut. The bulk value of preforms prepared by the molder will average 50% higher than those made by our process weighing, for instance, from 14 to 15 grams per cubic inch as compared with 18.5 to 20 grams per cubic inch of preforms made in accordance with the present invention. Our preforms of higher density are easier to place in molds of limited loading space, and are less subject to breakage during handling.

*Thermoplasticity.*—This property is perhaps the most important of all molding characteristics. The flow of plastic preforms made according to the process described herein has been proved to be superior to that of conventional compounds of the same type. When a definite pressure is applied, the mold will close faster with our preforms than with any other impact material, indicating that the material is flowing faster and exhibiting less resistance. Thus less pressure is required to mold a given size piece. As pressures required in plastic molding are extremely high, this factor is of great importance. The area of a molded article is very often limited by the capacity of the press, and it has been proved in many cases that articles too large to be molded in the available presses with conventional compounds could be satisfactorily molded in these presses when preforms of the type claimed herein are used. Time is saved by reason of the press closing faster, thus a shorter total molding cycle may be used.

*Electronic preheating.*—Cut or sawed preforms are ideal for use in high frequency preheaters, which are used to heat the mold charge just prior to its being placed in a transfer or compression mold. These preforms are smooth and flat, and being extremely dense, they are heated in the high frequency unit in one-half to three-quarters the time required to heat the conventional preform. Because of high initial and high operating cost of electronic preheaters, one unit must usually serve to preheat the charges for several presses, so that any saving of time during preheating is quite important.

*Resin segregation.*—When a conventional high impact phenolic molding compound is forced, during the molding process, through small openings, around sharp corners or through thin wall sections, the resin tends to flow away from the filler, forming sections of high filler concentration and sections of pure resin. This results in weak spots in the finished molding. The molding compound claimed herein does not show this tendency toward resin segregation, due to the unique viscosity and flow characteristics. Even in the thinnest molded sections, the resin and filler are present in the correct proportions, the structure is homogeneous, strength is uniform throughout the piece, shrinkage is uniform, and warpage is minimized.

*Molded surface.*—Successive molding runs of long duration on many different molds have proved that the finish imparted to moldings made from preforms prepared according to our process is superior to that of moldings from conventional compounds. This is due to the viscosity and flow characteristics and to the lack of resin segregation. An extremely thin film of resin forms against all mold surfaces, completely covering the filler and leaving a glossy, uniform texture which, in most cases, is as uniform as the surface obtained from compounds made with finely ground fillers.

*Finishing operations.*—Due to the ease and uniformity of flow and more rapid closing of the molding press, the two halves of the mold will close tighter when cut or sawed preforms are used than when conventional preforms are used. This results in a thinner cut-off or "flash" at the mold parting line. The removal of flash is an expensive item of finishing costs on high impact moldings and this is reduced considerably when parts have a thin flash. When the flash is heavy, it contains some of the fabric filler which is hard to trim and which leaves a fuzzy parting line on the casting when the flash is trimmed off. A thin flash breaks easily and leaves a clean parting line. Close dimensional tolerances are more easily held when a thin, uniform flash is obtained.

*Size and shape of preform.*—It may be readily understood that by sawing or die cutting the sheeted plastic, any desired size or shape preform may be readily made in large quantities, and the changeover from one size to another is accomplished in a matter of seconds. The custom molder, on the other hand, must have an expensive mold made for each size preform. Molds are heavy, must be bolted to the press, and in larger sizes, require several hours for a changeover. These preform molds are used only for the molder's own requirements, whereas an inexpensive cutting die may be used to fill the requirements of a number of molders who may be making parts of approximately the same area.

*Cost of manufacturing preforms.*—This item is very much lower for preforms made according to the processes claimed herein than when made in the conventional manner for the following reasons:

1. Rapid changeover from one size to another.
2. Lower die cost. Six to ten cutting dies can be made for the cost of making one preform mold. When preforms are sawed, no die cost is involved.
3. Lower initial and lower operating costs for cutting or sawing machines than for molding presses.
4. Faster operation. Molding presses move slowly; die cutting and sawing are fast operations. Multiple dies or stacked sheets may be used, so that cutting of many preforms in a single operation is feasible. Molded preforms are made from loose material, necessitating the weighing of each charge for the preform mold. In cut preforms the size of die or setting of saw guides, plus the thickness of sheet automatically determine the weight of preform, eliminating a weighing operation.
5. Mass production methods. Distribution of the same size preforms to a number of molders allows for employing mass production methods which increase efficiency and lower production costs.

Having thus described the invention, what is claimed as new and desired to be secured by Letters Patent is:

1. In a method of preparing a high impact thermosetting plastic preform of high density and flow, the steps which comprise reacting phenol, aniline, and formaldehyde, the formaldehyde being added as an aqueous solution, in the presence of calcium hydroxide as the sole catalyst at such temperatures and for times sufficient to form a primary resin, the amount of formaldehyde being 37.5% to about 49% of the weight of phenol, the calcium hydroxide being present in amount of about 4% to about 6% by weight of phenol, and the aniline being present in amount not greater than 12.5% by weight of phenol, thereafter mixing the primary resin with a vegetable protein in amount from 7% to 43% by weight of initial phenol, subjecting the mixture to elevated temperature sufficient to cause the protein to react with the resin, distilling the reaction product to remove excess formaldehyde and water, subjecting a mixture of the reaction product and a long fibered filler to intense kneading action at an elevated temperature to impregnate the filler, rolling the filled product to form a sheet, and cutting the sheet into preforms of a predetermined contour.

2. In a method of preparing high impact thermosetting plastic preforms of high density and flow, the steps which comprise reacting phenol, aniline, and formaldehyde, the formaldehyde being added as an aqueous solution, in the presence of calcium hydroxide as the sole catalyst and at elevated temperatures to form a primary resin, the amount of formaldehyde being 37.5% to about 49% of the weight of phenol, the calcium hydroxide being present in amount of about 4% to about 6% by weight of phenol, and the aniline being present in amount not greater than 12.5% by weight of phenol, thereafter mixing the primary resin with a vegetable protein in amount from 7% to 43% by weight of initial phenol, subjecting the mixture to elevated temperature sufficient to cause the protein to react with the resin, distilling the reaction product to remove excess formaldehyde and water, rapidly cooling the reaction product, subjecting a mixture of the reaction product and a long fibered filler in subdivided form to intense kneading action at an elevated temperature to impregnate the filler, rolling the filled product while hot to form a sheet, and cutting the sheet while hot into preforms of a predetermined contour.

3. In a method of preparing high impact thermosetting plastic preforms of high density and flow, the steps which comprise intensely kneading a mixture of a thermosetting phenol formaldehyde resin prepared with calcium hydroxide as the sole catalyst, the formaldehyde being added as an aqueous solution, the initial amount of formaldehyde being 37.5% to about 49% and of calcium hydroxide being about 4% to about 6% by weight of the initial amount of phenol, and containing chemically bound vegetable protein in amount from 7% to 43% by weight of initial phenol, with a macerated long fibered filler at an elevated temperature sufficient to cause the resin to flow and to impregnate the filler, rolling the filled resin while hot to form a sheet, and cutting the sheet into preforms of a predetermined contour.

4. In a method of preparing a thermosetting resin, the steps which comprise reacting phenol, aniline, and formaldehyde in the presence of calcium hydroxide as the sole catalyst at such temperatures and for times sufficient to form a primary resin, the amount of formaldehyde being 37.5% to about 49% of the weight of phenol, the calcium hydroxide being present in amount of about 4% to about 6% by weight of phenol, and the aniline being present in amount not greater than 12.5% by weight of phenol, the formaldehyde being added as an aqueous solution, thereafter mixing the primary resin with a vegetable protein in amount from 7% to 43% by weight of initial phenol, subjecting the mixture to elevated temperature sufficient to cause the protein to react wtih the resin, and distilling the reaction product to remove excess formaldehyde and water.

5. In a method of preparing a thermosetting resin, the steps which comprise reacting phenol, aniline, and formaldehyde in the presence of calcium hydroxide as the sole catalyst for a period of time sufficient to form a primary resin, the amount of formaldehyde being 37.5% to about 49% of the weight of phenol, the calcium hydroxide being present in amount of about 4% to about 6% by weight of phenol, and the aniline being present in amount not greater than 12.5% by weight of phenol, the formaldehyde being added as an aqueous solution, thereafter mixing the primary resin with a vegetable protein in amount from 7% to 43% by weight of initial phenol, subjecting the mixture to elevated temperature sufficient to cause the protein to react with the resin, distilling the reaction product to remove excess formaldehyde and water, and rolling the product into sheets to effect rapid cooling thereof.

6. In a method of preparing a thermosetting resin, the steps which comprise reacting phenol and formaldehyde in the presence of calcium hydroxide as the sole catalyst at such temperatures and for times sufficient to form a primary resin, the formaldehyde being added as an aqueous solution, the initial amount of formaldehyde being 37.5% to about 49% and of calcium hydroxide being about 4% to about 6% by weight of the initial amount of phenol, thereafter mixing the primary resin with a vegetable protein in amount from 7% to 43% by weight of initial phenol, subjecting the mixture to elevated temperature sufficient to cause the protein to react with the resin, and distilling the reaction product to remove excess formaldehyde and water.

7. A plastic composition characterized by high density and flow, for use in compression molding of high impact materials, said composition comprising in intimate admixture a long fibered filler and a homogeneous thermosetting resin, said resin consisting essentially of the dewatered reaction product of a phenol-aniline-formaldehyde primary resin prepared with calcium hydroxide as the sole catalyst and a vegetable protein in amount from 7% to 43% by weight of initial phenol, the amount of formaldehyde being 37.5% to about 49% of the weight of phenol, the calcium hydroxide being present in amount of about 4% to about 6% by weight of phenol, and the aniline being present in amount not less than 3.0% and not greater than 12.5% by weight of phenol.

8. A preform characterized by high density and flow for use in high impact compression molding, said preform comprising a long fibered, macerated filler impregnated with a homogeneous thermosetting resin, said resin consisting essentially of the dewatered reaction product of a phenol-aniline-formaldehyde primary resin, prepared with calcium hydroxide as the sole catalyst, the amount of formaldehyde being 37.5% to about 49% of the weight of phenol, the calcium hydroxide being present in amount of about 4% to about 6% by weight of phenol, and the aniline being present in amount not less than 3.0% and not greater than 12.5% by weight of phenol, and a soybean protein in amount from 7% to 43% by weight of initial phenol.

9. A thermosetting resin consisting essentially of the calcium hydroxide catalyzed reaction product of a phenol-aniline-formaldehyde primary resin prepared with calcium hydroxide as the sole catalyst, the amount of formaldehyde being 37.5% to about 49% of the weight of phenol, the calcium hydroxide being present in amount of about 4% to about 6% by weight of phenol, and the aniline being present in amount not less than 3.0% and not greater than 12.5% by weight of phenol, and a vegetable protein in amount from 7% to 43% by weight of initial phenol, said product being dewatered.

10. In a method of preparing a high impact thermosetting plastic preform of high density and flow, the steps which comprise reacting phenol, aniline, and formaldehyde in the presence of calcium hydroxide as the sole catalyst for a period of time sufficient to form a primary resin, the amount of formaldehyde being 37.5% to about 49% of the weight of phenol, the calcium hydroxide being present in amount of about 4% to about 6% by weight of phenol, and the aniline being present in amount not greater than 12.5% by weight of phenol, the formaldehyde being added as an aqueous solution, thereafter mixing the primary resin with a vegetable protein in amount from 7% to 43% by weight of initial phenol, subjecting the mixture to elevated temperature sufficient to cause the protein to react with the resin, distilling the reaction product to remove excess formaldehyde and water, subjecting a mixture of the reaction product and a long fibered filler to intense kneading action at an elevated temperature to impregnate the filler, and shaping the filled product while hot into preforms of predetermined contour.

FRANCIS E. CALVERT.
PAUL A. BURY.

REFERENCES CITED

The following references are of record in the file of this patent:

UNITED STATES PATENTS

| Number | Name | Date |
| --- | --- | --- |
| 1,924,514 | Redman et al. | Aug. 29, 1933 |
| 1,994,753 | Cherry | Mar. 19, 1935 |
| 2,053,850 | Sturken | Sept. 8, 1936 |
| 2,260,006 | D'Alelio | Oct. 21, 1941 |
| 2,365,671 | Watt | Dec. 26, 1944 |

OTHER REFERENCES

Taylor Chem. and Met. Eng., vol. 43 No. 4, April 1936, pp. 172 to 176.